June 17, 1952　　　W. G. LYMAN　　　2,601,120
WHEEL TEST STAND
Filed Sept. 6, 1947　　　　　2 SHEETS—SHEET 2
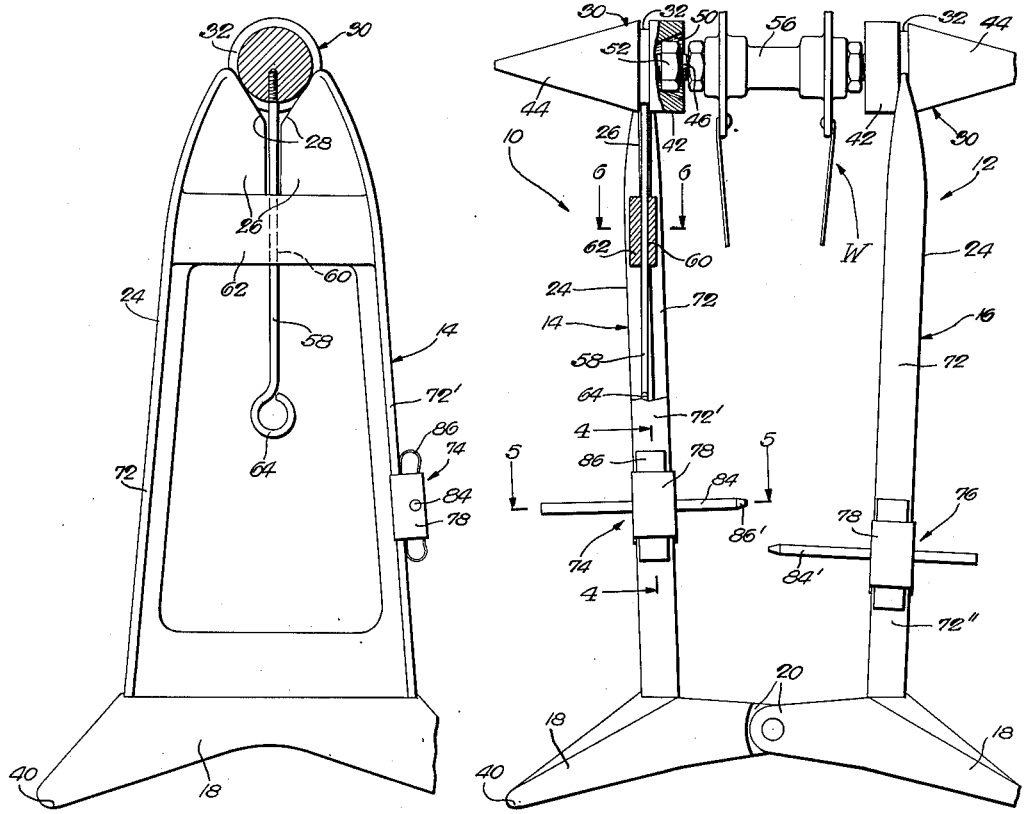
INVENTOR
WENDELL G. LYMAN
BY Edwin Levisohn
ATTORNEY Patented June 17, 1952

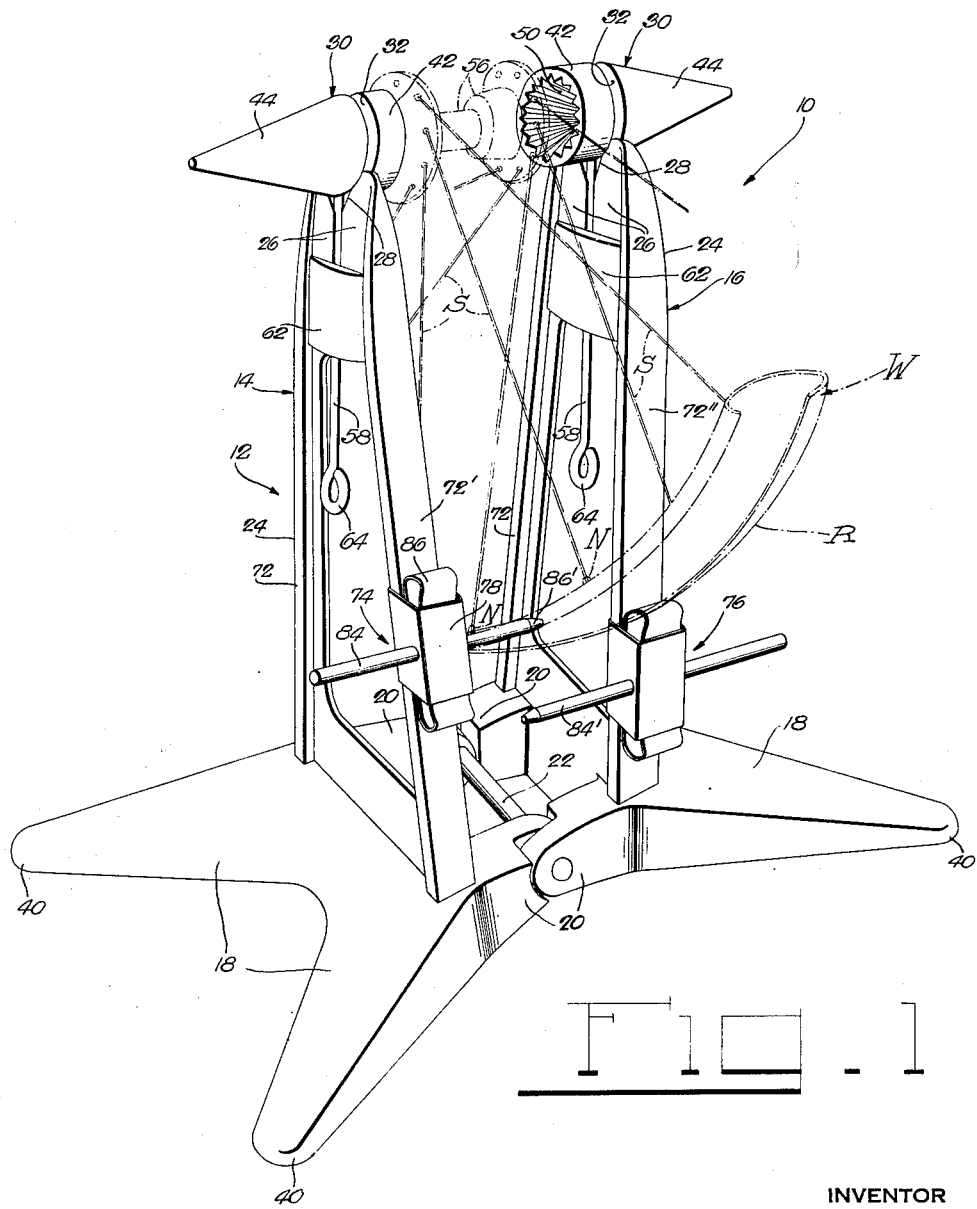

2,601,120

UNITED STATES PATENT OFFICE 2,601,120

WHEEL TEST STAND

Wendell G. Lyman, Brooklyn, N. Y., assignor to D. P. Harris Hardware & Manufacturing Co., Inc., New York, N. Y., a corporation Application September 6, 1947, Serial No. 772,557

3 Claims. (Cl. 33—203.16)

This invention relates generally to test stands for rotary wheels, and more particularly to truing stands for wire wheels of the type used for bicycles and motorcycles, for instance.

It is the primary object of the present invention to provide a stand of this kind, particularly for truing bicycle or motorcycle wheels, which is of extremely simple and inexpensive construction, and which is so light in weight and small in bulk as to be readily portable.

It is another important object of the present invention to provide the truing stand with a quick mounting which will, without any adjustment or exchange of parts, instantaneously accommodate wheels of widely different dimensions.

It is another important object of the present invention to mount the test instrumentalities of the truing stand so that they are readily accessible to an operator and instantly available for accurate and easily discernible tests on a wheel on the stand.

The above and other objects, features and advantages of the present invention will be fully understood from the following description, considered in connection with the accompanying illustrative drawings.

In the drawings:

Fig. 1 is a perspective view of a stand embodying the present invention;

Fig. 2 is a front elevation, partly in section, of the stand;

Fig. 3 is a side elevation, partly in section, of the stand;

Figs. 4 and 5 are enlarged fragmentary sections taken on the lines 4—4 and 5—5, respectively, of Fig. 2; and Fig. 6 is a section taken on the line 6—6 of Fig. 2.

Referring to the drawings, the reference numeral 10 designates a truing stand which comprises a frame 12, consisting of complementary sections 14 and 16. The frame sections 14 and 16 are provided at the bottom with preferably integral, outwardly projecting legs or bases 18 and inwardly projecting lugs 20, the latter being hingedly connected by a pin 22. The frame sections 14 and 16, which form the spreadable prongs of a fork above the hinge connection 22, are provided at their upper ends with integral transverse webs 26 of substantially uniform thickness which are provided with V-shaped notches 28 that serve as seats for bearing or mounting elements 30. The mounting elements 30 are identical and preferably provided with peripheral grooves 32 in which they become seated in the V-shaped notches 28 in the frame sections 14 and 16, respectively. The frame sections 14 and 16 may be made in the form of aluminum castings of considerable strength and relatively light weight.

As best shown in Figs. 1 and 2, the bases 18 are so formed that the truing stand 10 will, in any relative disposition of the frame sections 14, 16 and even if no wheel is mounted thereon, be supported on the ground at the four corners 40 of the bases 18. Since the base corners 40 are paired on opposite sides of the hinge connection 22, and well outside the upright portions 24, of the frame sections 14 and 16, the latter will normally be urged together when standing on the ground.

Each of the elements 30 has different wheel-mounting sections 42 and 44. The wheel-mounting sections 42 of the elements 30 are provided with cone-shaped sockets 50, the walls of which are fluted and serve as universal mountings for the opposite ends of a conventional axle 46 in a bicycle wheel W, for instance. The wheel W may be mounted on the truing stand 10 either by placing the bare axle ends directly in the sockets 50, or through intermediation of the customary lock nuts 52 on the axle as shown in Fig. 2.

The other mounting sections 44 of the elements 30 are cone-shaped and serve as a universal mounting for a wire wheel in which no axle has as yet been mounted or from which the axle has been removed. In that event, the elements 30 are inverted 180° on their respective frame sections 14 and 16 so as to bring the mounting sections 44 into confronting relation to each other and permit them to enter the adjacent open ends of the customary hub 56 of the axle-less wheel to be mounted on the stand.

The mounting elements 30 are provided with depending rods 58, respectively, which are turnable and axially movable in holes 60 in transverse ribs 62, on the frame sections 14 and 16, respectively. The lower ends of the rods 58 are preferably formed into eyes 64 to serve as convenient handles for raising and lowering as well as turning, said rods and also the mounting elements 30 carried thereby. Thus, when the mounting of an axle-less wheel requires inversion of the elements 30 from their present disposition on the frame sections 14 and 16 as shown in Figs. 1 and 2, they are raised by their rods 58 from their respective seats 28, turned 180°, and then lowered again onto their seats 28.

The opposite sides of the upright portion 24 of each frame section are in the form of ribs 72 of which either one is used as a track for a wheel testing unit 74 or 76. Inasmuch as these test units are identical in construction, only one will be described in detail with particular reference to Figs. 4 and 5. As there shown, the test unit 74 comprises a U-shaped slide 78, the parallel legs 80 of which straddle the frame track 72' and are formed inwardly of the latter as at 82 so as to be guided on said track for movement longitudinally thereof. Axially movable in the slide 78 is a test finger 84 which has a preferably bevelled end 86'. Anchored in the slide 78, and interposed between the track 72' and the test finger 84, is a leaf spring 86 which serves the dual function of yieldingly resisting movement of the slide 78 on the track 72', as well as yieldingly resisting axial movement of the test finger 84 in the slide 78. The spring 86 is anchored in the slide 78 by partially surrounding the test finger 84 as at 88. The test finger 84 may be used for the purpose indicated in Fig. 1, i. e., to test the rim R of the mounted wheel W as to its location at every point of its periphery in a median plane at right angles to the axle 46. To this end, the test unit 74 is shifted on the track 72' until the test finger 84 is axially in alignment with the adjacent side of the wheel rim R (Fig. 1), whereupon finger 84 is axially shifted in the slide 78 until its bevelled end 86' is in close proximity to the wheel rim R. The customary nipples N on the wire spokes S of the mounted wheel W may then be tightened or loosened, whichever is required, in order to true the wheel.

The test finger 84' of the other test unit 76 may be used in a similar manner to test the mounted wheel W as to the circular formation of its rim R. To this end, the test unit 76 is shifted on its track 72" until the test finger 84' thereof is adjacent the outer periphery of the rim R, whereupon certain ones of the nipples N of the wire spokes S of the wheel may be loosened or tightened, as the case may be, until the wheel rim R assumes a truly circular shape.

For ready initial mounting of the test units 74 and 76 on, or their ready removal from, their respective tracks 72' and 72", they are merely slid over the top ends of the latter, the transverse ribs 62 on the frame sections 14 and 16 being to this end sufficiently thin at the tracks 72' and 72", to permit the passage of the respective test units thereat.

The instant base formation of the hingedly connected frame sections 14 and 16, coupled with the present mounting elements 30, afford an unusually quick mounting for a wheel to be trued, it being merely necessary to spread the frame sections 14 and 16 apart, interpose the wheel to be trued therebetween with the hub thereof or an axle in the latter in alignment with the mounting elements 30, and then release the frame sections 14 and 16 which of themselves will close into wheel-mounting relation. Conversely, removal of a wheel from the stand 10 merely requires momentary separation of the frame sections 14 and 16, as will be readily understood. Also of considerable advantage is the alterative use of the elements 30 for instantaneous mounting of wheels with or without inserted axles, it being merely necessary to turn the elements 30, as described, in order to adapt them for mounting either wheel. The provision of the adjustable test units 74 and 76 directly on the upright portions 24 of the frame sections 14 and 16 places these test units readily accessible to, and easily discernible by, an operator truing the mounted wheel.

It will be understood that various changes in the details of construction and in the arrangement of the parts may be made without departing from the underlying idea or principles of the invention within the scope of the appended claims.

Having thus described my invention, what I claim and desire to secure by Letters Patent is:

1. A test stand for a wheel having in its hub a journalled axle with threaded ends carrying polygonal nuts, comprising two members movable to and from each other, and opposite bearings carried by said members, respectively, and having conical confronting recesses, respectively, of which the walls are axially corrugated to interlock with peripheral edge portions of said nuts on the adjacent axle ends, respectively, of a wheel between said members.

2. A test stand for a wheel having in its hub a journalled axle with threaded ends carrying polygonal nuts, comprising two members movable to and from each other, and opposite bearings carried by said members, respectively, and having conical confronting recesses, respectively, of which the walls are axially corrugated to interlock with peripheral edge portions of said nuts on the adjacent axle ends, respectively, of a wheel between said members, said members each having a notched seat portion defined therein at the upper end thereof, and said bearings each having a peripheral groove receivable in one of said notches for seating said bearings on said members, respectively.

3. A test stand for a wheel having in its hub a journalled axle with threaded ends carrying polygonal nuts, comprising two members movable to and from each other, and opposite bearings carried by said members, respectively, and having conical confronting recesses, respectively, of which the walls are axially corrugated to interlock with peripheral edge portions of said nuts on the adjacent axle ends, respectively, of a wheel between said members, said members each having a notched seat portion defined therein at the upper end thereof, and said bearings each having a peripheral groove receivable in one of said notches for seating said bearings on said members, respectively, each bearing being provided with a rod for positioning the bearing in its seat portion, said rod having one end thereof secured in the bearing and depending therefrom into the groove thereof and through the notched seat portion in which the bearing is seated.

WENDELL G. LYMAN.

REFERENCES CITED

The following references are of record in the file of this patent:

UNITED STATES PATENTS

| Number | Name | Date |
|---|---|---|
| 563,944 | Thiem | July 14, 1896 |
| 566,851 | Ferguson | Sept. 1, 1896 |
| 1,343,526 | Smith | June 15, 1920 |
| 1,442,717 | Frappart | Jan. 16, 1923 |
| 1,489,151 | Prossen | Apr. 1, 1924 |
| 2,193,169 | George | Mar. 12, 1940 |
| 2,205,532 | Kohl | June 25, 1940 |
| 2,295,447 | Bierman | Sept. 8, 1942 |

FOREIGN PATENTS

| Number | Country | Date |
|---|---|---|
| 725,963 | France | Feb. 22, 1932 |
| 883,175 | France | Mar. 15, 1943 |
| 888,522 | France | Sept. 6, 1943 |